(12) United States Patent
Pacella et al.

(10) Patent No.: US 6,381,906 B1
(45) Date of Patent: May 7, 2002

(54) MODULAR DOOR WITH ATTACHMENT MECHANISM

(75) Inventors: John P. Pacella, Rochester Hills; Joseph E. Mrozowski, Clarkston; Larry A. Mercier, Jr., Troy, all of MI (US)

(73) Assignee: The Budd Company, Troy, MI (US)

( * ) Notice: Subject to any disclaimer, the term of this patent is extended or adjusted under 35 U.S.C. 154(b) by 0 days.

(21) Appl. No.: 09/433,912

(22) Filed: Nov. 3, 1999

(51) Int. Cl.$^7$ .................................................. B60J 5/04
(52) U.S. Cl. ...................... 49/502; 296/146.7; 296/146.5
(58) Field of Search ........................... 49/502, 348, 349, 49/351; 296/146.7, 146.5

(56) References Cited

U.S. PATENT DOCUMENTS

| | | | |
|---|---|---|---|
| 4,328,642 A | | 5/1982 | Presto |
| 4,405,173 A | | 9/1983 | Piano |
| 4,662,115 A | | 5/1987 | Ohya et al. |
| 4,711,052 A | | 12/1987 | Maeda et al. |
| 4,785,585 A | | 11/1988 | Grier et al. |
| 4,882,842 A | * | 11/1989 | Basson et al. ................ 29/857 |
| 4,949,509 A | * | 8/1990 | Gold ........................... 49/502 |
| 5,048,234 A | * | 9/1991 | Lau et al. ...................... 49/502 |
| 5,111,619 A | * | 5/1992 | Billin et al. ................... 49/502 |
| 5,127,191 A | * | 7/1992 | Ohta ............................. 49/62 |
| 5,345,721 A | * | 9/1994 | Stein et al. ................... 49/502 |
| 5,446,999 A | * | 9/1995 | Inaba et al. ................... 49/502 |
| 5,482,343 A | * | 1/1996 | Bradac ....................... 296/39.1 |
| 5,529,370 A | * | 6/1996 | Veit ......................... 296/146.7 |
| 5,536,060 A | | 7/1996 | Rashid et al. |
| 5,857,732 A | | 1/1999 | Ritchie |
| 5,884,434 A | * | 3/1999 | Dedrich et al. ................ 49/503 |
| 5,904,002 A | * | 5/1999 | Emerling et al. ............. 49/502 |
| 5,906,072 A | * | 5/1999 | Feige et al. .................... 49/502 |
| 5,927,020 A | | 7/1999 | Kobrehel |
| 5,927,021 A | | 7/1999 | Kowalski et al. |
| 5,931,682 A | * | 8/1999 | Takiguchi et al. ............. 439/34 |
| 6,035,601 A | * | 3/2000 | Yamaguchi et al. ...... 52/784.16 |
| 6,123,385 A | * | 9/2000 | Bailey et al. ............. 296/146.7 |
| 6,185,872 B1 | * | 2/2001 | Seeberger et al. ............ 49/502 |

FOREIGN PATENT DOCUMENTS

| | | |
|---|---|---|
| DE | 19526367 A1 | 2/1996 |
| DE | 19755450 C1 | 4/1999 |
| EP | 0694427 A2 | 1/1996 |
| FR | 2776965 A | 10/1999 |
| WO | WO9745283 | 12/1997 |

\* cited by examiner

*Primary Examiner*—Gregory J. Strimbu
(74) *Attorney, Agent, or Firm*—Harness, Dickey & Pierce, P.L.C.

(57) ABSTRACT

A door includes a door shell coupled to a door module. The door shell includes an outer panel secured to an inner panel, the inner panel having an opening therein. The door shell defines a hollow cavity. The door module includes a cassette and an interior trim panel coupled to the cassette. The door module further includes an attachment mechanism for securing the door module to the door shell. The attachment mechanism is visually hidden during operation of the door. The inner panel is cooperative with the door module to provide a positive rest position for the door module prior to securing the door module to the door shell.

16 Claims, 12 Drawing Sheets

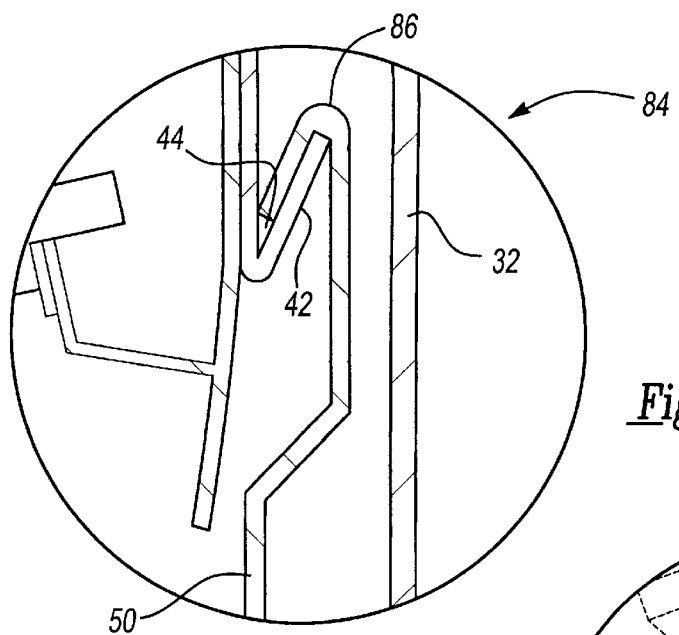
_Fig-4_
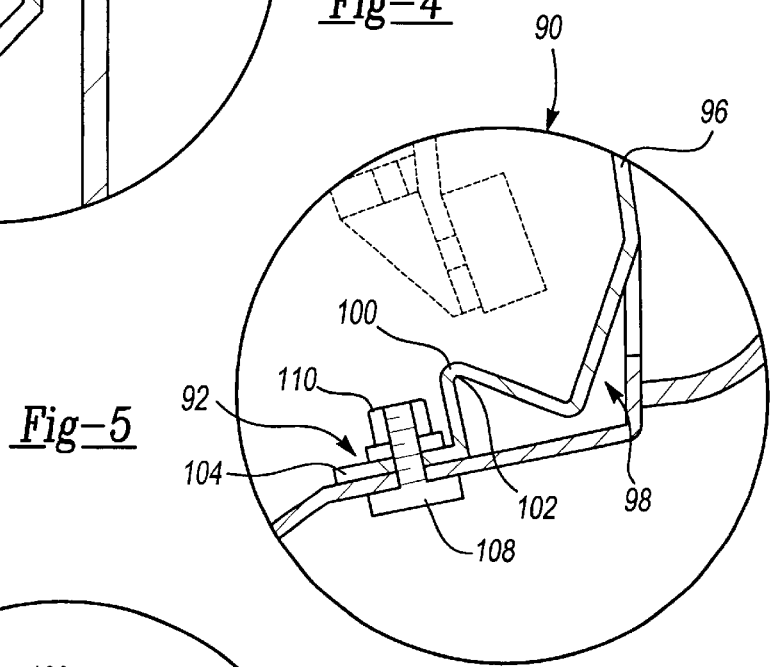
_Fig-5_
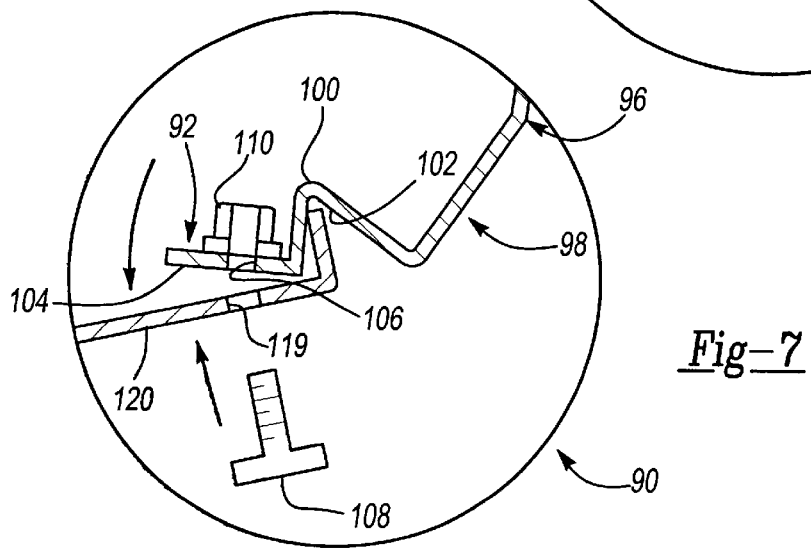
_Fig-7_

MODULAR DOOR WITH ATTACHMENT MECHANISM

BACKGROUND OF THE INVENTION

1. Technical Field

The present invention generally relates to motor vehicles, and more particularly, to a modular door for a motor vehicle.

2. Discussion

Manufacturers of motor vehicles have long been faced with the difficult task of constructing a door which not only provides easy ingress and egress but also performs a variety of other functions such as mounting a window, a window regulator mechanism and other door hardware. Conventionally, vehicle doors include an inner panel and an outer panel fixed together about their edges to form a hollow shell in the interior lower portion thereof. The inner panel typically includes relatively small access apertures for permitting the insertion of hardware such as the window regulator mechanism and a door actuation device. However, the insertion and subsequent attachment of the door hardware tends to be a time consuming process that is inconvenient for the vehicle door assembler and costly to the vehicle manufacturer.

Previous attempts to reduce the time required for door assembly have failed to produce satisfactory results particularly with regard to the appearance and structure of the door. In one example, an inner panel sub-assembly is produced off-line and then attached during one of the final steps of vehicle assembly. However, some portions of the inner panel sub-assembly are exposed to an occupant's view after assembly. Unfortunately, difficulty often arises when attempting to match the color of the components painted on-line with the color of the components painted off-line. Another design proposes the use of a separate door plate for mounting hardware such as the window regulator and the window glass. However, this design requires modification of the belt reinforcement structure of the inner door panel to allow for insertion of the window.

SUMMARY OF THE INVENTION

It is therefore an object of the present invention to provide a modular door assembly requiring less assembly time and effort at final assembly.

It is another object of the present invention to provide a structurally sound and cost effective modular door assembly for use in a motor vehicle.

It is yet another object of the present invention to provide a modular door exhibiting superior aesthetic appearance by removing the attachment fasteners from view.

According to the present invention, a vehicle door includes a door shell coupled to a door module. The door shell includes an outer panel secured to an inner panel to define a cavity therebetween, the inner panel having an opening communicating with the cavity. The door module includes a cassette, an interior trim panel coupled to the cassette, and an attachment mechanism for securing the door module to the door shell. The attachment mechanism is visually hidden during normal operation of the door. Finally, the cassette is cooperative with the inner panel to provide a positive rest position prior to securing the door module to the door shell.

Further areas of applicability of the present invention will become apparent from the detailed description provided hereinafter. It should be understood however that the detailed description and specific examples, while indicating preferred embodiments of the invention, are intended for purposes of illustration only, since various changes and modifications within the spirit and scope of the invention will become apparent to those skilled in the art from this detailed description.

BRIEF DESCRIPTION OF THE DRAWINGS

The present invention will become more fully understood from the detailed description and the accompanying drawings, wherein:

FIG. 4 is an enlarged view of the upper attachment mechanism in cooperation with the door shell;

FIG. 5 is an enlarged view of the lower attachment mechanism in cooperation with the door shell;

FIG. 7 is an enlarged view of the lower attachment mechanism during assembly;

DETAILED DESCRIPTION OF THE PREFERRED EMBODIMENT

Figure 1:
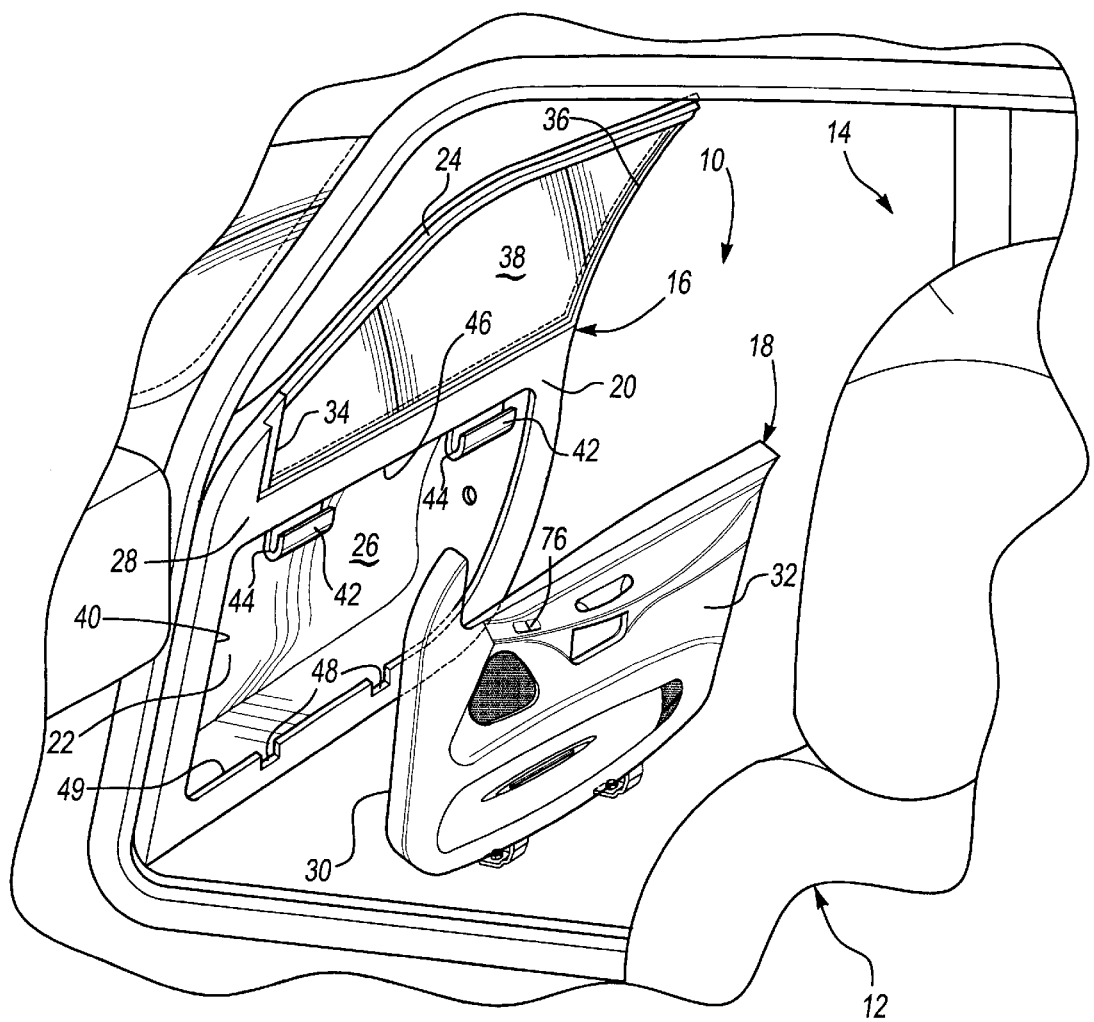
FIG. 1 is a partial exploded perspective view of a vehicle including a door constructed in accordance with the teachings of the present invention as viewed from the interior of the vehicle.

With reference to the drawings, a modular door constructed in accordance with the teachings of an embodiment of the present invention is generally identified at reference numeral 10. The modular door is shown operatively associated with an exemplary motor vehicle 12 having a door opening 14.

As particularly shown in FIG. 1, the modular door 10 is illustrated to generally include a door shell 16 and a door module 18. The door shell 16 includes an inner panel 20 and an outer panel 22 interconnected at their periphery to form a window frame 24 and a hollow cavity 26 separated by a belt reinforcement 28. The door shell 16 also includes a hinge (not shown) for swingingly mounting the door shell 16 on the body of the vehicle 12 in a conventional manner. The door module 18 includes a cassette 30 and an interior trim panel 32 which may be remotely constructed, connected to one another, and assembled to the vehicle 12 at a convenient time and location within the vehicle assembly line.

As a result of the modular nature of door 10, the door shell 16 may be mounted to the vehicle body during online assembly without the presence of the door module 18. This assembly method enables the door shell 16 to be painted along with the vehicle body thereby insuring uniformly colored panels. In addition, it should be noted that the door module 18 may be pre-assembled into one substantially integral unit ready for attachment at any point during the vehicle final assembly. Accordingly, the awkward, inconvenient attachment of door hardware through small access openings as discussed above is substantially eliminated. The vehicle manufacturer also benefits from lower inventory requirements and an improvement in overall product quality.

In reference to FIG. 1, the window frame 24 includes a forward channel 34 and a rearward channel 36 for guiding a window assembly 38 within the window frame 24. As is conventionally known, the window frame 24 also includes a suitable weather stripping for sealing the window assembly 38 to the window frame 24 when the window is in a raised or closed position. In addition, the inner panel 20 includes an enlarged opening 40 extending therethrough for providing access to the hollow cavity 26. The opening 40 is sized to permit installation of the door module 18 and, more particularly, to operatively accommodate the component operators mounted to the module such as the window operator and lock operator mechanisms.

To facilitate the modular assembly of door 10, door shell 16 includes a pair of hangers 42 located on and protruding from the inner panel 20. The hangers 42 are generally upwardly opening "V" shaped devices or clasps defining a pocket 44. The hangers 42 are preferably located at or above an upper edge 46 of the opening 40 near the belt reinforcement 28 and may be integrally formed with the inner panel 20. The inner panel 20 further includes a pair of guide slots 48 located at a lower peripheral edge 49 of the opening 40 to facilitate alignment of the door module 18 with the shell 16 as hereinafter described.

Figure 2:
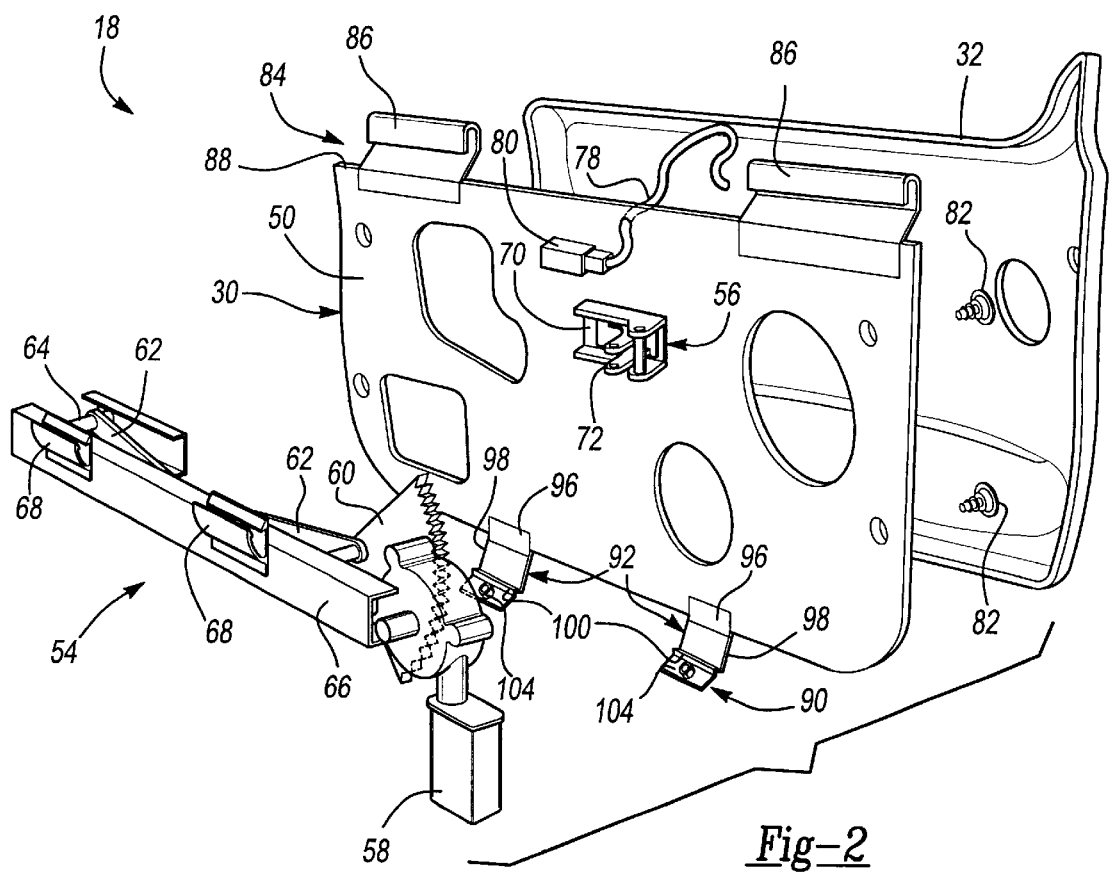
FIG. 2 is an exploded perspective view of the door module.

With reference to FIG. 2, the cassette 30 includes a plate 50 for mounting a variety of component operators 52 thereto. For example, the illustrated embodiment of the door module 18 includes a window operator 54 for controlling the vertical movement of the window assembly 38 in relation to the door shell 16 and a door operator 56 for selectively unlatching the door 10 from the vehicle body. The window operator 54 and the door operator 56 are each coupled to the plate 50. The window operator 54 depicted in the drawings includes an electric motor 58 driving a sector gear 60 coupled to a pair of window regulator arms 62. The window regulator arms 62 are provided with rollers 64 at their distal ends which cooperate with a generally "C" shaped channel 66 to vertically displace the channel 66 upon operation of the motor. A pair of snap receivers 68 are coupled to the channel 66 by a method known commonly in the art such as threaded fastening. As is described below with reference to FIG. 13, the snap receivers are adapted to receive cooperatively configured snaps for coupling the window assembly to the channel. It should be understood that the illustrated embodiment may be modified to accommodate other component operators, including other window operating and regulating devices, without departing from the scope of the present invention as defined by the appended claims.

Figure 8:
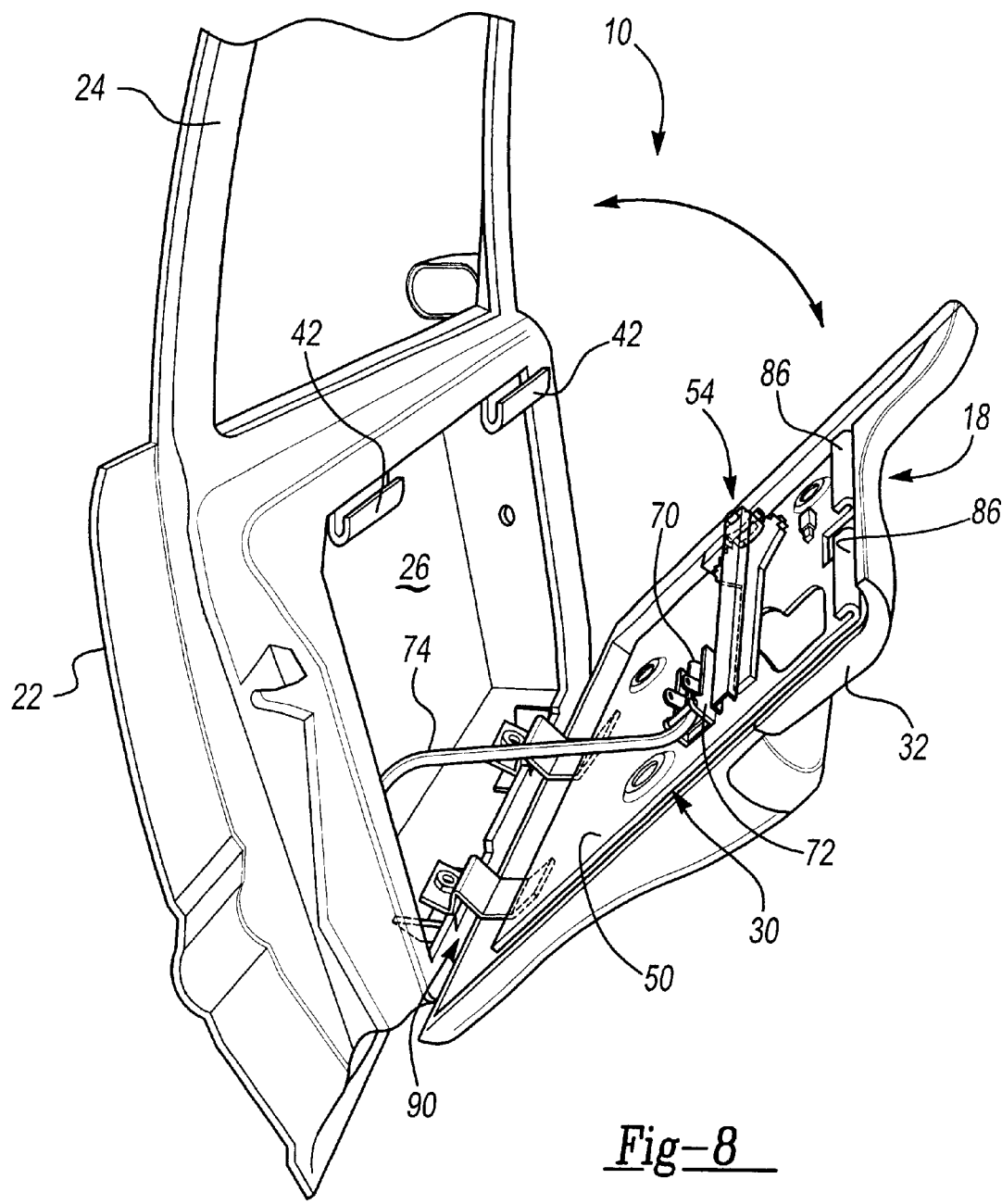
FIG. 8 is a perspective view illustrating the attachment of the lock rod during assembly.

The door operator 56 includes an inner door handle 70 pivotally coupled to a quick connect fitting 72 that is mounted to the plate 50. Fitting 72 is adapted to accept a lock rod 74 (FIG. 8) as will be described in greater detail hereinafter to allow connection of the door operator 56 to the appropriate door hardware. Other door operators may be used without departing from the scope of the invention as defined in the appended claims.

To achieve an aesthetically pleasing appearance, the interior trim panel 32 completely shields the cassette 30 from view once the door module 18 has been fixed to the door shell 16. In the illustrated embodiment, the interior trim panel 32 also includes a power window switch 76 (FIG. 1) having an integral quick connect wiring harness 78 (FIG. 2) terminating at a plug 80. In order to facilitate the electrical interconnection of the vehicle's battery (not shown) and the power window switch 76, the plug 80 and a portion of the wiring harness 78 is routed through an aperture (not shown) in the plate 50 and subsequently mounted thereto. The door module 18 is completed by connecting the interior trim panel 32 to the cassette 30 such as via composite fasteners 82. It should be appreciated that the method of interconnecting the interior trim panel 32 with the cassette 30 is merely exemplary and is not intended to limit the scope of the present invention.

Figure 3:
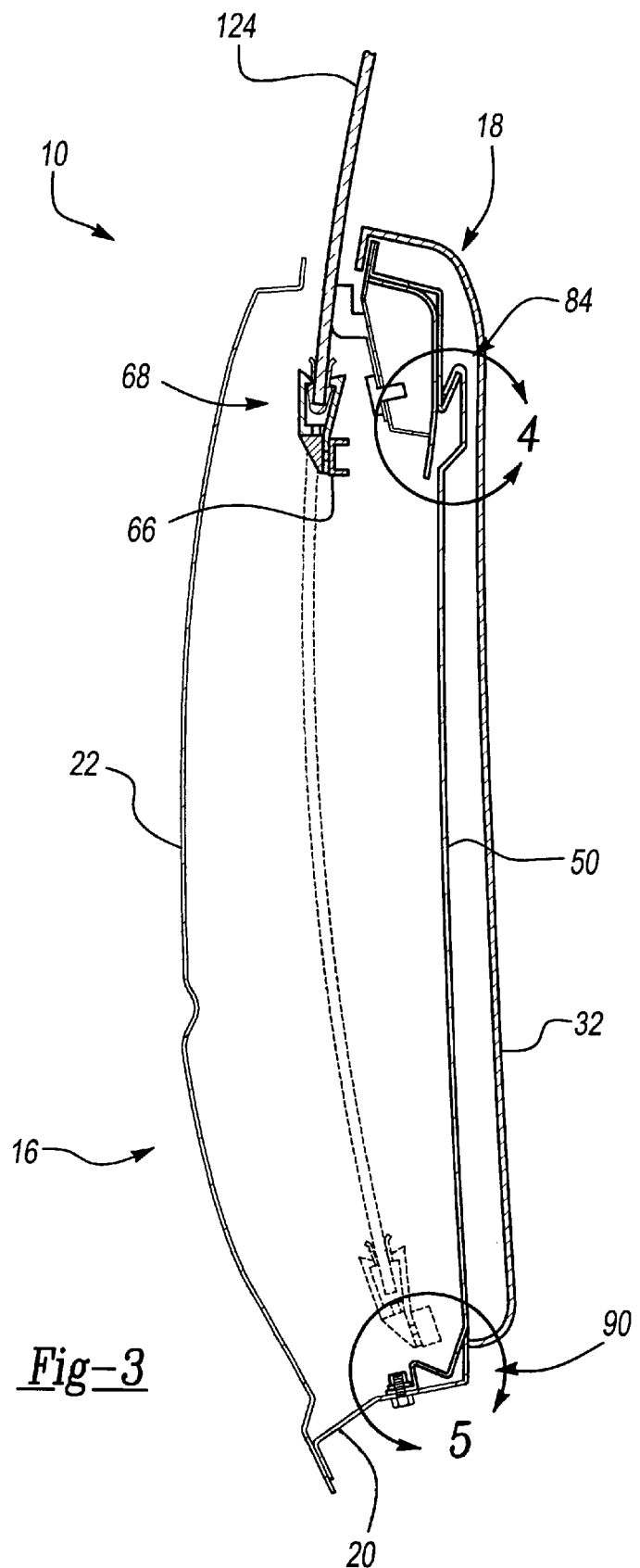
FIG. 3 is a simplified cross-sectional view of the vehicle door during assembly.

With reference to FIGS. 3 and 4, the door module 18 includes an upper attachment mechanism 84 having a pair of hooks 86 extending downwardly from an upper end 88 of the plate 50. Each of the hooks 86 is disposable in one of the pockets 44 to engage the hangers 42 and couple the door module 18 to the door shell 16.

As best seen in FIGS. 2, 5 and 7, the door module 18 also includes a lower attachment mechanism 90 for interconnecting the door module 18 and the door shell 16. Specifically, the lower attachment mechanism 90 includes a pair of downwardly extending pivot brackets 92 coupled to a lower end 94 of the plate 50. Each of the pivot brackets 92 includes a tab 96 coupled to the inner panel 20, a skid plate 98 and a lip 100 which forms a seat 102 for cooperation with the guide slots 48 of the inner panel 20. The seat being defined by two substantially planar portions intersecting at a bight. Pivot bracket 92 further includes a generally planar flange 104 with an aperture 106 extending therethrough for receipt of a fastener 108. In the preferred embodiment, a weld nut 110 is secured to the flange 104 and aligned with the aperture 106 to facilitate a blind interconnection of the pivot bracket 92 with the door shell 16.

Figure 6:
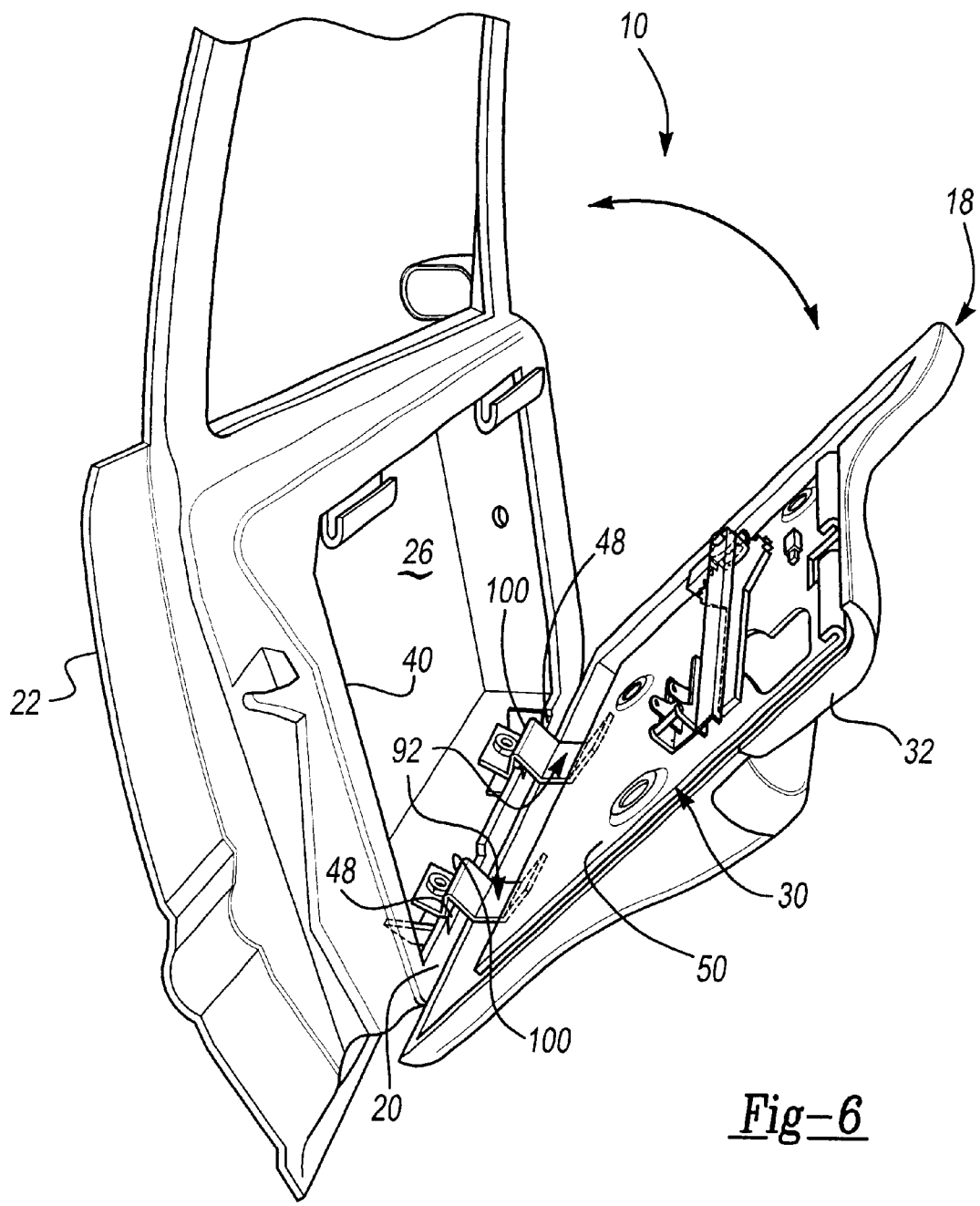
FIG. 6 is a perspective view illustrating one of the steps performed during assembly.
Figure 9:
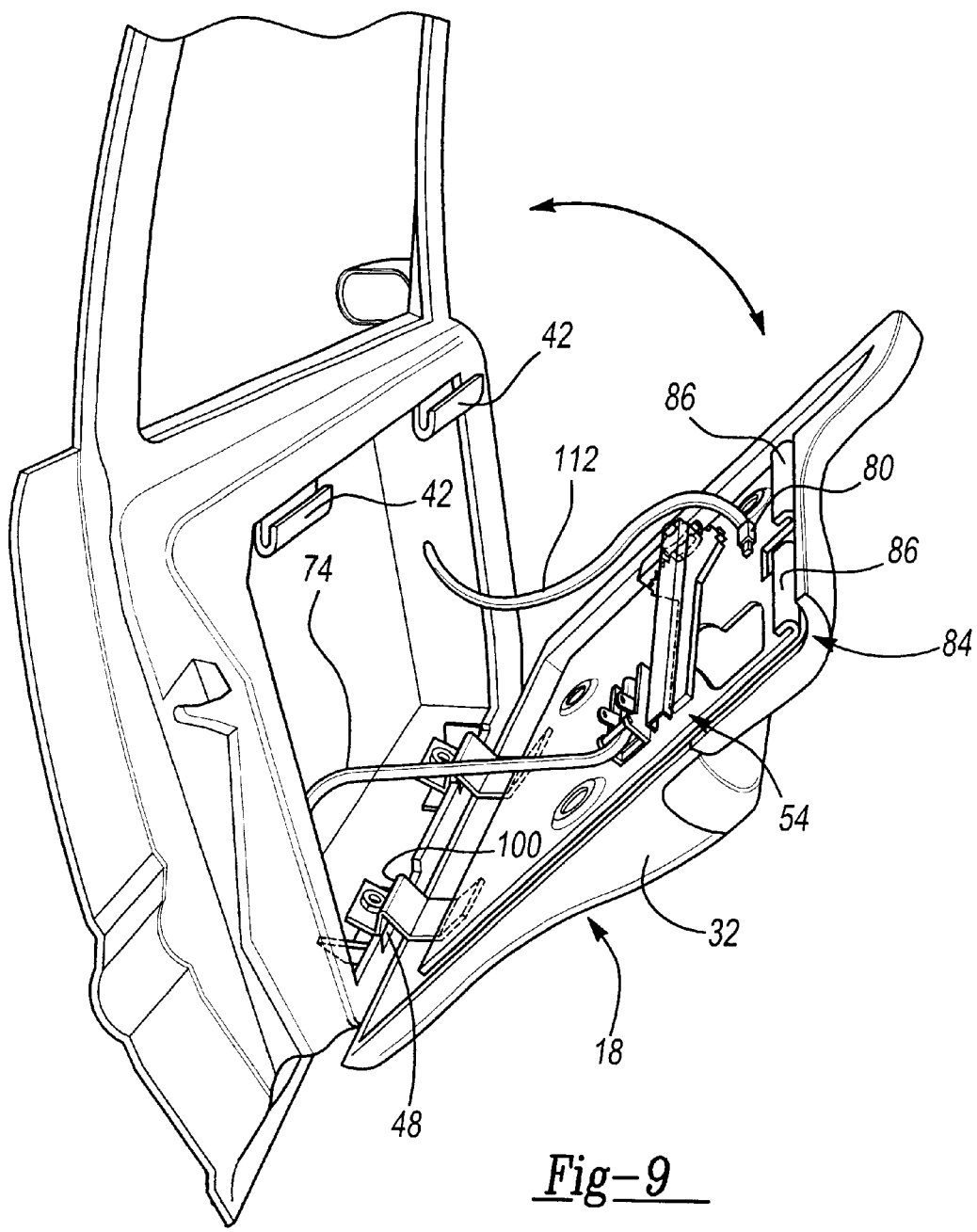
FIG. 9 is a perspective view illustrating attachment of the power window wiring harness.

With reference to FIGS. 6–14, the assembly sequence of the modular door of the present invention is described. As shown in FIGS. 6 and 7, the door module 18 is initially positioned such that the pivot brackets 92 are disposed within the guide slots 48 thereby aligning the interior trim panel 32 with the door shell 16. More particularly, the seats 102 of the pivot brackets 92 engage the guide slots 48 to provide a pivot point and a positive rest position. While the door module 18 is at the positive rest position shown in FIG. 8, an assembler connects the lock rod 74 with the quick connect fitting 72 to provide a mechanical connection between the inner door handle 70 and the door latch (not shown). Similarly, while the door module 18 is at the positive rest position, the plug 80 is connected to a vehicle power harness 112 as shown in FIG. 9. It should be appreciated that any number of components such as the lock rod 74 may be conveniently connected to an associated component operator such as inner door handle 70 while the door module 18 is at the positive rest position.

Figure 10:
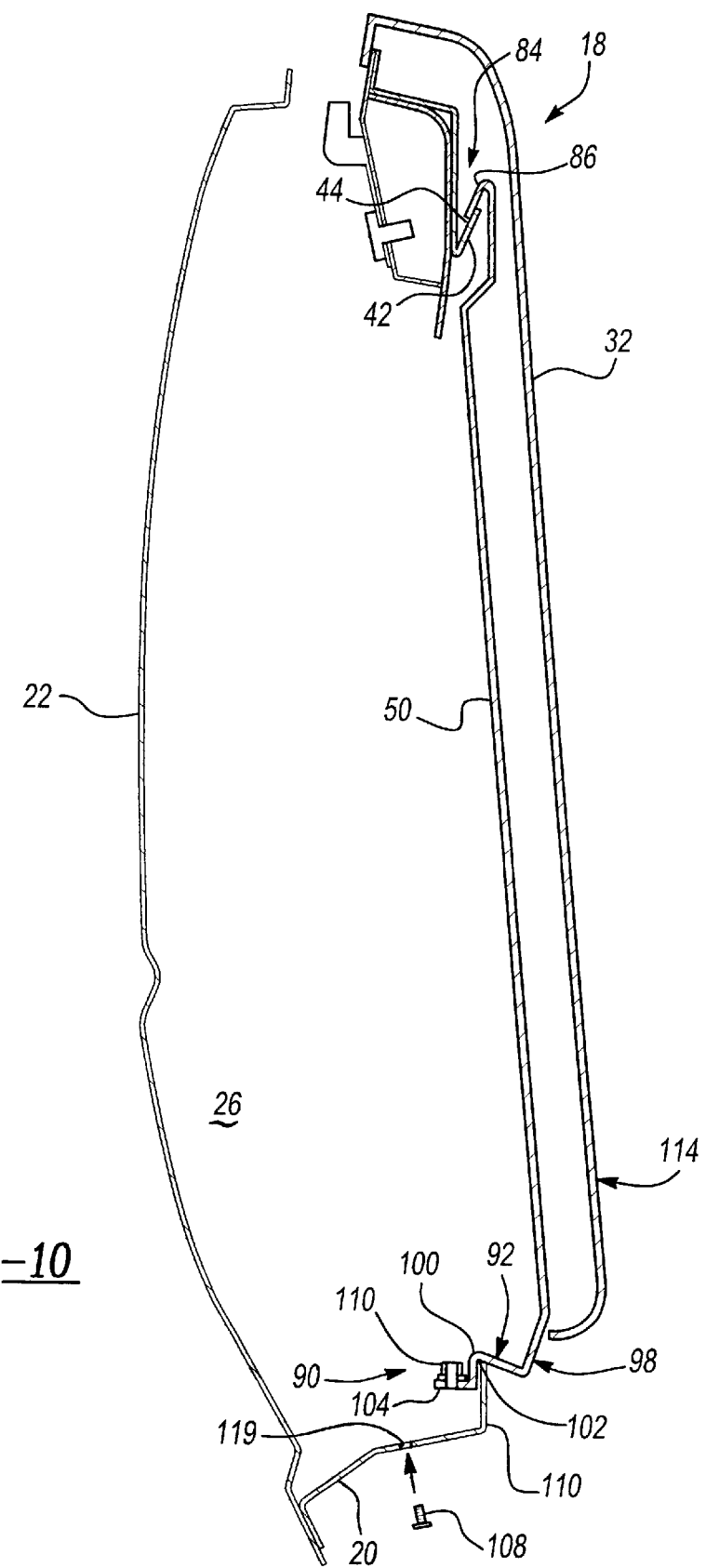
FIG. 10 is a partial cross-sectional view depicting the location of the door module of the present invention relative to the door shell during assembly.

After the electrical and mechanical connections have been completed, the door module 18 is pivoted to position the hooks 86 above the pockets 44 as shown in FIG. 10. While the upper end 88 of the plate 50 is being held toward the belt reinforcement 28 to position the hooks 86 in coupling proximity to the hangers 42, an assembler forces a bottom portion 114 of the door module 18 towards the door shell 16. As such, the seats 102 are disengaged from the guide slots 48 and enter the cavity 26. Because the pivot brackets 92 are no longer supported by the inner panel, the door module 18 lowers such that the hooks 86 of the cassette 30 enter the pockets 44 thereby coupling the upper end 88 of the plate 50 to the inner panel 20 of door shell 16. One skilled in the art will appreciate that the pivot brackets 92 are configured such that the lip 100 and the skid plate 98 will ride in the guide slots 48 once the door module 18 is rotated to position the hooks 86 relative to the hangers 42 as earlier described. Accordingly, the pivot brackets 92 are allowed to enter the hollow cavity 26 until an inner surface 116 of the interior trim panel 32 engages an outer surface 118 of the inner panel 20. It should be appreciated that the apertures 106 are now positioned in alignment with apertures 119 extending through a bottom portion 120 of the inner panel 20.

Figure 11:
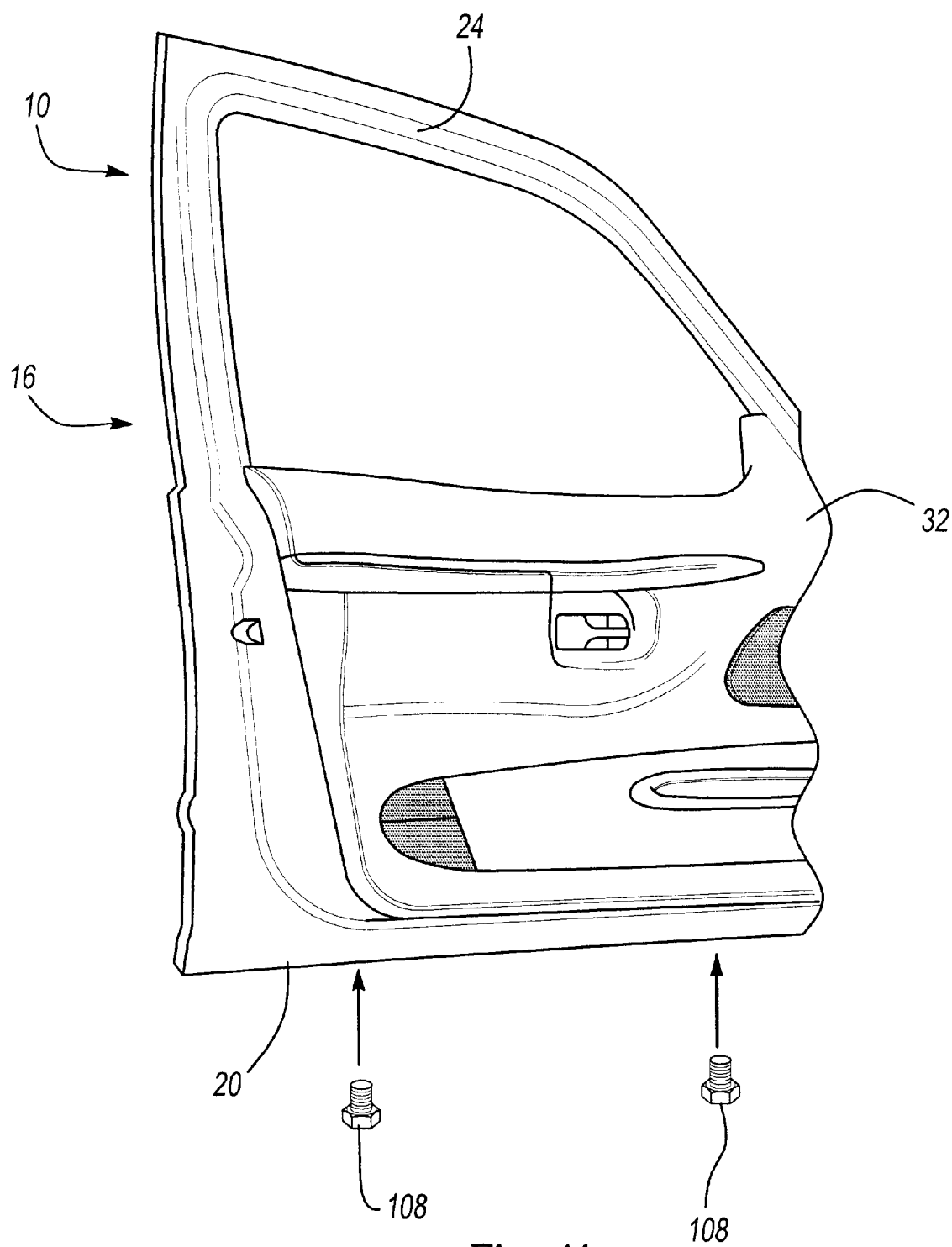
FIG. 11 is a perspective view of the vehicle door with the lower attachment mechanism fasteners exploded in alignment for assembly.

Referring to FIGS. 10 and 11, fasteners 108 are disposed within apertures 119 and rotated to threadingly engage the weld nuts 110 thereby coupling the lower end 94 of the cassette 30 to the door shell 16. Each of the fasteners 108 is positioned to be visually hidden during normal operation of the vehicle 12. Specifically, the bottom portion 120 of the inner panel 20 is of significant width to shield the fasteners 108 from view.

Figure 12:
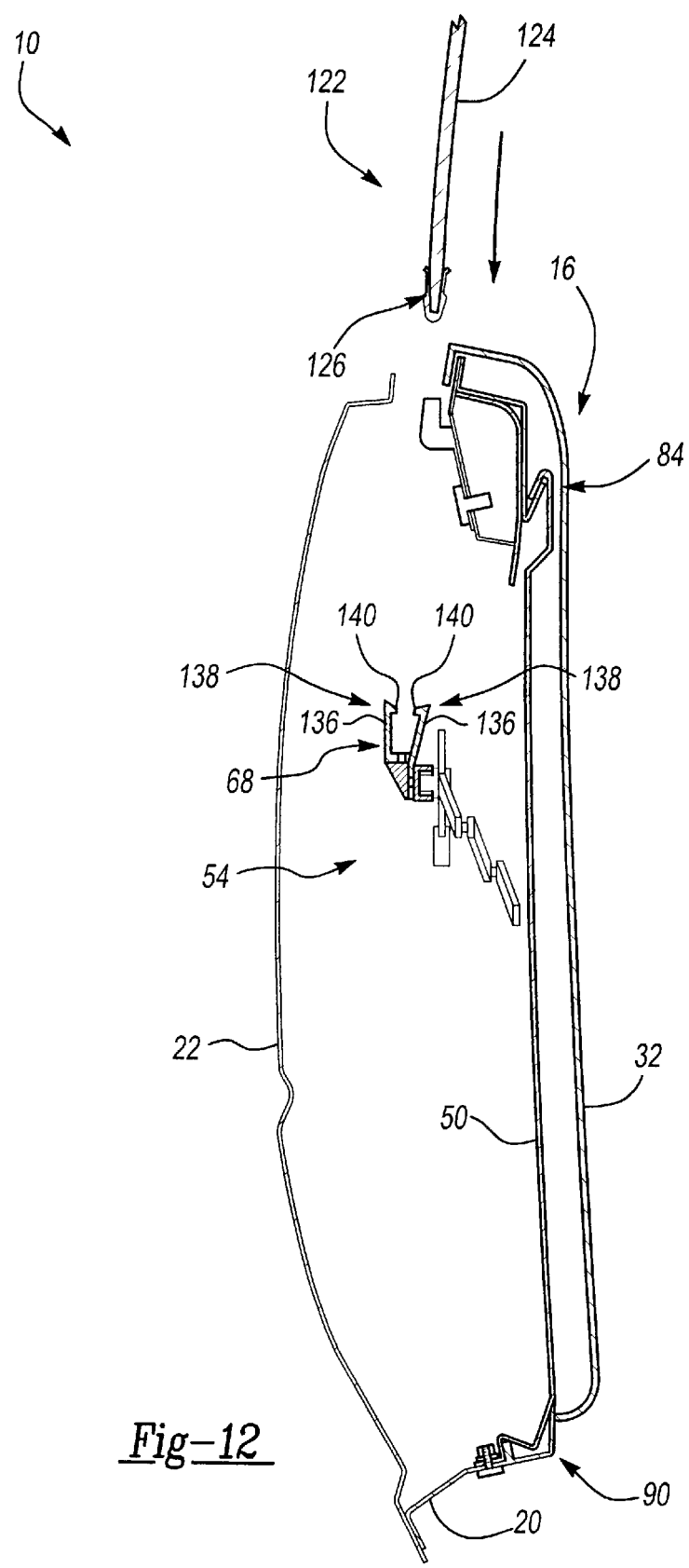
FIG. 12 is a partial cross-sectional view depicting the window assembly attachment step of assembly.
Figure 13:
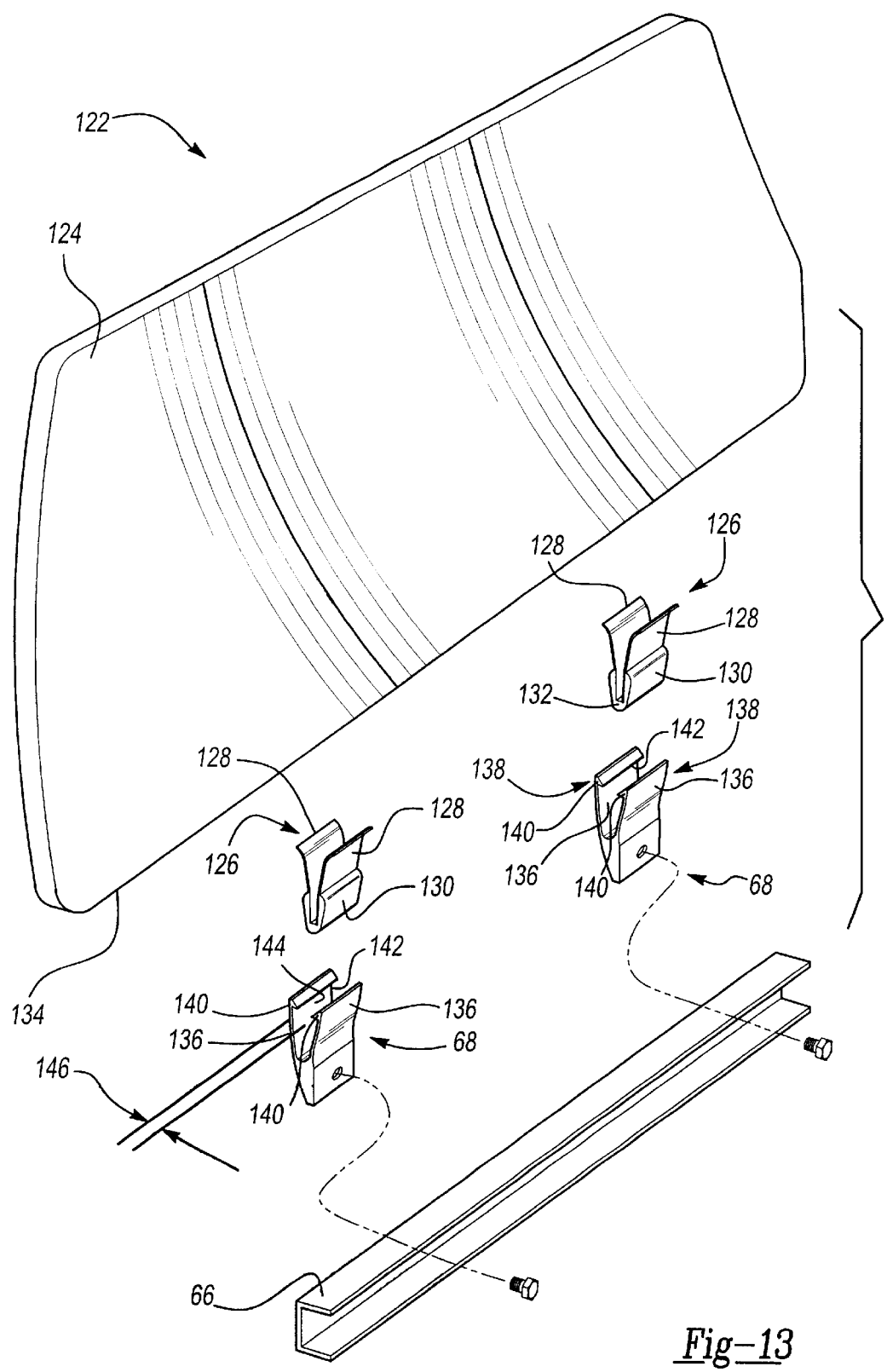
FIG. 13 is an exploded perspective view of the window assembly.

Referring to FIGS. 12 and 13, the assembly of modular door 10 is completed by constructing a window assembly 122 and inserting the window assembly 122 within the window frame 24 to blindly couple the window assembly to the window operator 54. One skilled in the art will appreciate that the method of blindly assembling the window assembly 122 to the modular door 10 allows a vehicle manufacturer to provide a modular door without sacrificing the structural integrity of the belt reinforcement 28.

Figure 14:
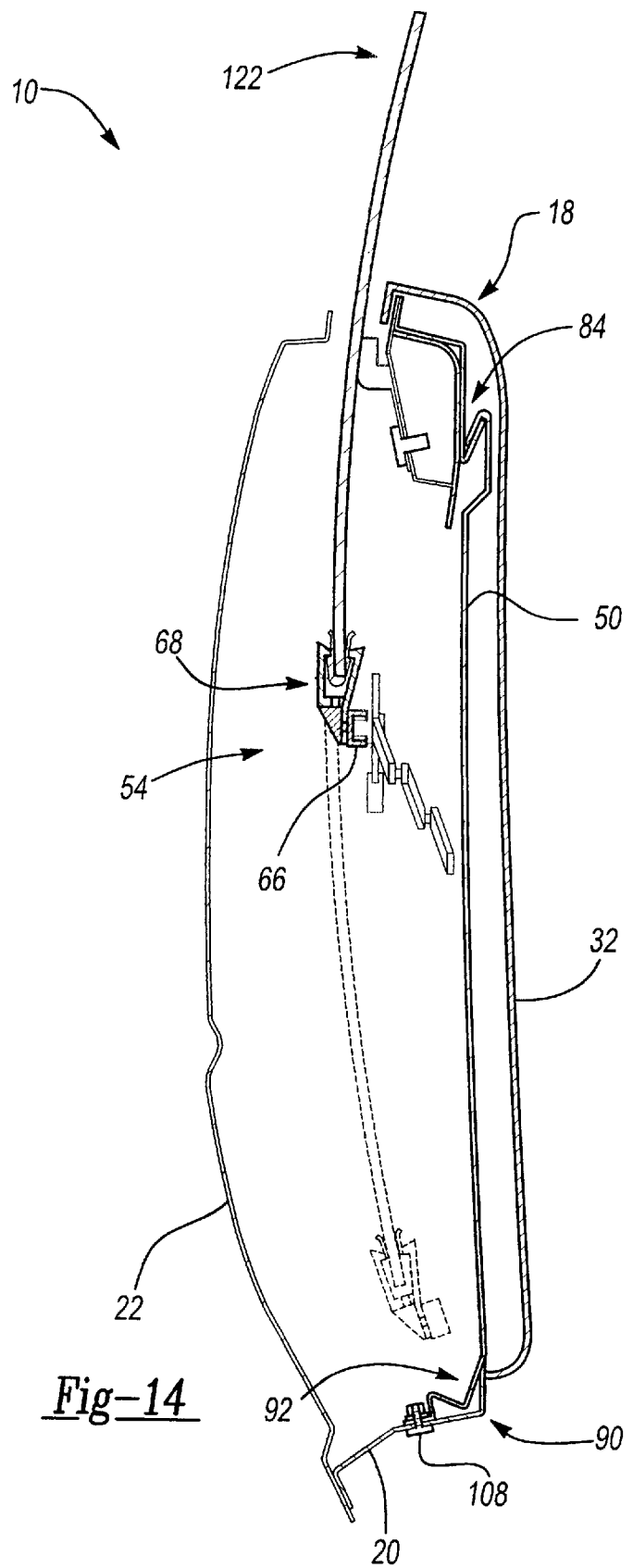
FIG. 14 is a simplified cross-sectional view of the completed modular door assembly of the present invention.

The window assembly 122 includes a glass panel 124 and a pair of snaps 126. Each of the snaps 126 includes a pair of divergent panels 128 interconnected by a tapered plunger 130. The tapered plunger 130 includes a seat 132 for receiving a lower edge 134 of the glass panel 124. Each of the snaps 126 are fixed to the glass panel 124 using methods known in the art such as adhesive bonding or mechanical fastening. Each of the snap receivers 68 are preferably bolted to the channel 66 to allow service of the glass panel 124 after initial assembly. The snap receivers 68 include a pair of divergent, bifurcated legs 136 each terminating at an end 138 including a barb 140. Each of the barbs 140 include an engagement edge 142 which defines an effective insertion opening 144 having a dimension 146. One skilled in the art will appreciate that the effective insertion opening dimension 146 is smaller than the greatest width of the tapered plunger 130. Accordingly, as the window assembly 122 is inserted into the window frame 24, the tapered plunger 130 biasedly engages the bifurcated legs 136. The tapered plunger 130 is further axially disposed toward the snap receiver 68 until the barb 140 engages a retention plane 148 of the tapered plunger thereby creating a snap-fit coupling as shown in FIG. 14. Specifically, the barb 140 and the retention plane 148 compliment each other such that an axial force in an upward direction will not separate the window assembly 122 from the window operator 54 after the snap-fit operation has been completed. Accordingly, if service is desired, a technician must remove at least a portion of the interior trim panel 32 and disconnect the snap receivers 68 from the channel 66. At this time, the window assembly 122 may be removed from the window frame 24.

Therefore, it should be appreciated that the configuration and operation of the modular door 10 provides both manufacturing and functional advantages over the prior art. Specifically, the modular configuration of the present invention reduces the cost and time required to assemble a door on the vehicle production line. Additionally, the blind attachment of the window assembly 38 provides for an uninterrupted, structurally robust, belt reinforcement.

The foregoing discussion discloses and describes merely exemplary embodiments of the present invention. One skilled in the art will readily recognize from such discussion, and from the accompanying drawings and claims, that various changes, modifications and variations may be made therein without department from the spirit and scope of the invention as defined in the following claims:

What is claimed is:

1. A vehicle door comprising:
   a door shell including an outer panel secured to an inner panel, said inner panel having an opening therein, said door shell defining a hollow cavity;
   a fastener; and
   a door module including a pivot bracket having a first portion and a second portion, said first portion engaging said door shell at a first location to support said door module at a positive rest position prior to securing said door module to said door shell, said fastener engaging said second portion of said pivot bracket and securing said second portion of said pivot bracket to said door shell at a second location spaced apart from said first location thereby coupling said door module to said door shell, wherein said first portion is disengaged from said door shell when said second portion is secured to said door shell.

2. The vehicle door of claim 1 further including a component operator coupled to said door module and wherein said positive rest position places said component operator in coupling proximity to a door component.

3. The vehicle door of claim 2 wherein said component operator includes a door actuator adapted for selectively unlatching said door from a vehicle body and wherein said door component includes a lock rod.

4. The vehicle door of claim 2 wherein said door module includes a quick connect wiring harness adapted to electrically interconnect a power source and said component operator.

5. The vehicle door of claim 1 wherein said door shell includes a hanger and wherein a hook extends from said door module, said hanger and said hook cooperating to secure said door module to said door shell.

6. The vehicle door of claim 5 wherein said hanger includes an upwardly opening clasp integrally formed with said inner panel.

7. The vehicle door of claim 1 wherein said pivot bracket includes a tab coupled to said inner panel.

8. The vehicle door of claim 1 wherein said first portion of said pivot bracket includes at least two substantially planar portions intersecting at a bight.

9. The vehicle door of claim 1 wherein said second portion of said pivot bracket includes a flange having an aperture adapted to receive said fastener for coupling said door module to said door shell.

10. The vehicle door of claim 1 wherein said door module includes a snap receiver movably coupled thereto for accepting a window assembly.

11. The vehicle door of claim 10 wherein said window assembly includes a snap engaging said snap receiver.

12. The vehicle door of claim 1 wherein said pivot bracket downwardly extends from said door module and cooperates with a recess formed in said inner panel to align said door module with said door shell.

13. A vehicle door comprising:

a door shell including an outer panel and an inner panel, said inner panel having an upper region and a lower region wherein said lower region includes a substantially vertically extending section and a substantially horizontally extending section, said substantially horizontally extending section engaging said outer panel to form a lower portion of a hollow cavity defined by said door shell;

a hanger coupled to and upwardly extending from said upper region of said inner panel; and a door module including a pivot bracket having a first portion and a second portion, said first portion engaging said vertically extending section to support said door module at a positive rest position prior to securing said door module to said door shell, said door module further including a hook selectively engagable with said hanger wherein said hook engages said hanger when said second portion of said pivot bracket engages said horizontally extending section and wherein said first portion of said pivot bracket is disengaged from said door shell when said second portion engages said substantially horizontally extending section of said inner panel.

14. The vehicle door of claim 13 further including a fastener coupling said second portion to said substantially horizontally extending section.

15. The vehicle door of claim 14 wherein said vertically extending section includes a slot and wherein said first portion engages said slot when said door module is in said positive rest position thereby aligning said door module with said door shell prior to assembly.

16. The vehicle door of claim 15 wherein said door module includes a second pivot bracket spaced apart from said pivot bracket wherein said second pivot bracket is selectively coupled to said substantially horizontally extending portion.

* * * * *